United States Patent Office 3,416,962

Patented Dec. 17, 1968

3,416,962

PREPARING ETCHED SUBSTANCES FOR VACUUM DEPOSITION OF A METAL THEREON

Richard H. Storck, Telford, and Alfred A. Adomines, Wayne, Pa., assignors to Sperry Rand Corporation, New York, N.Y., a corporation of Delaware No Drawing. Filed Aug. 5, 1964, Ser. No. 387,759
4 Claims. (Cl. 134—26)

ABSTRACT OF THE DISCLOSURE

An etched copper substrate prior to the vapor deposition thereon of a metal, such as aluminum or chromium, is treated by rinsing the copper substrate with a low molecular weight alcohol, such as methyl alcohol, followed by a water rinse, then by dipping the copper substrate in a 0.5% by weight aqueous potassium cyanide solution followed by rinsing with water and then dipping the resulting treated copper substrate in a series of about three actetone baths of increasing purity and then drying in a dust-free atmosphere.

This invention relates to the vacuum deposition of a metal upon a substrate, such as an etched copper substrate. More particularly, this invention relates to the treatment of an etched metallic surface or substrate prior to the vacuum deposition thereon of a metal coating. Still more particularly, this invention relates to the cleaning of an etched copper substrate, without employing physical abrasion or scrubbing, to remove oxides and other surface contaminants therefrom prior to the vacuum deposition of a metal, such as aluminum or chromium, thereon.

In the vacuum deposition of a thin film or coating of a metal upon a metallic surface, one practice involves etching the metallic surface. The etched surface is then cleaned and the surface contaminants removed therefrom in order to promote the adhesion of the vacuum deposited film or coating. The success of the vacuum deposition operation and the satisfactory performance of the resulting article is dependent upon the satisfactory adhesion of the vacuum deposited metal film or coating. Thus, it is desirable to clean the etched metal surface to insure that the vacuum deposited film or coating will not tend to peel or otherwise separate from the etched metal surface. In addition, cleaning of the etched metal surface promotes uniformity in the vacuum deposited metal film.

Accordingly, it is an object of this invention to provide an improved etched metal substrate useful for the vacuum deposition of a metallic film or coating thereon.

A further object of this invention is to provide an improved method for preparing clean, etched copper substrates particularly suitable for the vacuum deposition of a metal film or coating thereon.

Another object of this invention is to provide a method not involving physical abrasion or scrubbing for preparing clean etched metallic substrates, particularly etched copper substrates, preliminary to the vacuum deposition of a metal, such as aluminum or chromium, thereon.

How these and other objects of this invention are achieved will become apparent in the light of the accompanying disclosure.

It has now been discovered that a metal substrate, such as an etched copper substrate, can be cleaned by immersion and/or treatment in a number of special treating solutions or liquids, including a dip in an aqueous alkali metal cyanide bath, to produce a clean etched metal substrate which presents a surface upon which a vacuum deposited metal film, such as a film of aluminum or chromium, is strongly adhered or attached. More particularly, it has been discovered that oxide and other surface contaminants, such as hydrocarbons and other surface occluded materials, may be removed from an etched copper substrate by subjecting said substrate to treatment involving a plurality of treatment steps including rinses or dips in water, aqueous cyanide solution and non-aqueous solvents in a special sequence.

In accordance with the practice of this invention, a metal surface, such as an etched copper substrate, after having been soaked for about 20–30 minutes in a stripping solution in order to remove any photo-resist patterns, is cleaned as follows: The etched copper substrate is rinsed with an alcohol, such as a low molecular weight alcohol, e.g., a $C_1C_4$ alcohol, such as methanol, ethanol, propanol, isopropanol and n-butanol. The alcohol rinsing is followed by a water rinse, such as a rinse with cold tap water and then with demineralized water. Following the water rinse, the etched copper substrate is immersed in a diulte solution of an alkali metal cyandie, such as in a solution of about 0.5% potassium cyanide, for a short time, about 10 seconds. The etched copper substrate is then again rinsed with water, such as with cold tap water, followed by a demineralized water rinse. Thereupon, the etched copper substrate is immersed in baths, such as in three successive baths, of a high purity solvent, such as a ketone solvent, e.g., acetone. These baths of high purity solvent, such as acetone baths, are successively cleaner. Following this operation, the copper substrate is then air dried in a dust-free hood and immediately placed in a vacuum system for the subsequent vacuum deposition of a metal thereon.

In the first mentioned alcohol rinse in the treatment of the etched substrate in accordance with this invention, any low molecular weight, low boiling, preferably anhydrous, alcohol may be employed, or mixtures thereof. Particularly preferred are the alcohols methanol and ethanol. Other alcohol-like organic solvents, preferably similar low molecular weight, volatile, oxygenated hydrocarbons, such as the low molecular weight, volatile ketones and ethers, e.g., acetone and ethyl ether, may be employed in place of the alcohol or in admixture therewith.

The water rinse is preferably carried out completely with demineralized water although a water rinse involving a rinse with first cold tap water followed by a rinse with demineralized water yields satisfactory results. Distilled water might also be employed to replace the tap water and, if desired, the demineralized water might be replaced in whole or in part by distilled water.

In the final rinsing operation, preferably employing three baths of successively cleaner high purity solvent, such as acetone, other molecular weight, volatile, nonaqueous or anhydrous solvents, or mixtures thereof, are also useful. Specifically, in addition to acetone, other oxygenated hydrocarbon solvents, such as alcohols, ketones, such as methyl ethyl ketone, and esters, such as ethyl ether, are also useful, as well as the alcohols mentioned hereinabove.

The final operation of air drying the thus-treated etched substrate is carried out in a dust-free environment, such as in a dust-free hood. This drying operation might further be improved by carrying out the drying operation in a controlled environment, such as in an atmosphere substantially free of air or oxygen, e.g., in an inert gas atmosphere, such as nitrogen or helium.

The following is exemplary of the practice of this invention. An etched copper substrate is soaked in a stripping solution for about 20–30 minutes to remove any photoresist material and the like employed during the etching operation. The treated etched copper substrate is then rinsed successively with alcohol, such as ethyl alcohol, cold tap water and demineralized water. The etched copper substrate is then dipped in a 0.5% aqueous solution of a potassium cyanide for about 10 seconds, followed by a rinse with cold tap water and room temperature demineralized water. The etched copper substrate is then immersed in three baths of successively cleaner high purity acetone. Following the three successive acetone dips, the etched copper substrate is air dried in a dust-free environment and is immediately placed in the vacuum system for the subsequent deposition of a metal, such as aluminum or chromium, thereon. Use of demineralized water at hot temperatures, it is believed, may tend to increase oxidation, and, therefore, cold demineralized water is preferded. However, suitable results are obtained with the demineralized water kept at room temperature, e.g., 72° F.

As will be apparent to those skilled in the art, in the light of the foregoing disclosure many modifications, alterations and substitutions are possible in the practice of this invention without departing from the spirit or scope thereof.

The embodiments of the invention in which an exclusive property or privilege is claimed are defined as follows:

1. A method of treating an etched copper substrate prior to the vapor deposition thereon of a metal selected from the group consisting of chromium and aluminum which comprises rinsing said substrate with an alcohol selected from the group consisting of methanol, ethanol, propanol, isopropanol and n-butanol, washing the substrate with water, dipping the substrate in an aqueous solution containing a minor amount of an alkali metal cyanide, followed by again washing the substrate with water and dipping the substrate in baths of acetone of increasing purity followed by air-drying the resulting treated substrate in a dust-free environment.

2. A method in accordance with claim 1 wherein said alkali metal cyanide is potassium cyanide and wherein said potassium cyanide is present in an amount of about 0.5% by weight of said aqueous solution.

3. A method in accordance with claim 1 wherein said copper substrate is dipped in said aqueous alkali metal cyanide solution for about 10 seconds.

4. A method in accordance with claim 1 wherein each of said water washing operations includes washing the substrate with tap water followed by washing with demineralized water.

References Cited

UNITED STATES PATENTS

| | | | |
|---|---|---|---|
| 331,810 | 12/1885 | Mutchler | 252—141 |
| 1,014,752 | 1/1912 | Ellis | 134—38 |
| 2,284,743 | 6/1942 | Kawecki et al. | 134—42 |
| 2,453,764 | 11/1948 | Snyder | 148—6.2 |
| 3,030,238 | 4/1962 | Cohn | 134—26 |
| 3,132,975 | 5/1964 | Freud | 148—6.14 |

MORRIS O. WOLK, *Primary Examiner.*

M. D. BURNS, *Assistant Examiner.*

U.S. Cl. X.R.

134—2, 29; 252—79.1, 141